United States Patent [19]
White et al.

[11] Patent Number: 5,129,427
[45] Date of Patent: Jul. 14, 1992

[54] PULSATION DAMPER FOR A PUMPED LIQUID SYSTEM

[75] Inventors: Lawrence W. White; Gabriel J. Pietrykowski, both of Bryan, Ohio

[73] Assignee: The Aro Corporation, Bryan, Ohio

[21] Appl. No.: 686,696

[22] Filed: Apr. 17, 1991

[51] Int. Cl.⁵ ............................................. F16L 55/04
[52] U.S. Cl. ........................................ 138/30; 138/31; 417/540
[58] Field of Search ............................ 138/26, 30, 31; 220/85 B; 417/540

[56] References Cited

U.S. PATENT DOCUMENTS

| | | | |
|---|---|---|---|
| 2,290,337 | 7/1942 | Knauth | 138/30 |
| 2,299,611 | 10/1942 | Clark | 138/30 |
| 2,300,722 | 11/1942 | Adams et al. | 138/30 |
| 2,324,701 | 7/1943 | Herman | 138/30 |
| 2,339,076 | 1/1944 | Huber | 138/30 |
| 2,340,125 | 1/1944 | Huebner et al. | 138/30 |
| 2,343,320 | 3/1944 | Parker | 138/30 |
| 2,394,401 | 2/1946 | Overbeke | 138/30 |
| 2,638,932 | 5/1953 | Alexander | 138/30 |
| 2,697,451 | 12/1954 | Knauth | 138/30 |
| 3,348,579 | 10/1967 | Swift et al. | 138/31 |
| 3,442,293 | 5/1969 | Erdmann | 138/30 |
| 3,587,653 | 6/1971 | Jacobellis et al. | 138/30 |
| 3,669,151 | 6/1972 | Fleming | 138/31 |
| 3,672,402 | 6/1972 | Bloemer | 138/31 |
| 3,741,692 | 6/1973 | Rupp | 417/540 |
| 4,556,087 | 12/1985 | Cassilli | 138/30 |
| 4,603,711 | 8/1986 | Porel | 138/30 |
| 4,846,364 | 7/1989 | Boe | 138/30 |

FOREIGN PATENT DOCUMENTS

| | | | |
|---|---|---|---|
| 2266017 | 10/1975 | France | 138/30 |
| 948675 | 2/1964 | United Kingdom | 138/30 |

Primary Examiner—James E. Bryant, III
Attorney, Agent, or Firm—Robert F. Palermo

[57] ABSTRACT

A pulsation damper for a pumped liquid system has a housing with two axially identical hollow halves which, when joined at their flanges, form a substantially cylindrical cavity. Each housing half has a port on its longitudinal axis for fluid communication with a liquid chamber and a gas chamber defined by a flexible non-porous member. A pressurizing valve is provided, in a manual embodiment, for manually increasing or decreasing pressure in the gas chamber. An automatic pressure compensator is provided in an automatic embodiment and is so sized and configured as to be insertable and removable from the housing of the pulsation damper through the port on the end of housing. Provision is also made for modularly adding volumes of air to increase the effective gas chamber volume.

9 Claims, 4 Drawing Sheets

PULSATION DAMPER FOR A PUMPED LIQUID SYSTEM

BACKGROUND OF THE INVENTION

This invention relates generally to fluid pressure regulation and more particularly to pulsation dampers for absorbing pressure pulsations and pressure surges in a fluid handling system.

Air operated diaphragm pumps and other low pressure pumps generate fluid discharge pressure pulsations which correspond to changes in direction of movement of the diaphragm in the pump. In some applications, such pulsations are objectionable because they cause inconsistent flow, hydraulic system shock, and potentially can damage associated fluid handling equipment.

Pulsation dampers are used to reduce the magnitude of, or to eliminate entirely, the pressure pulsations described. These damp hydraulic system pressure pulsations and smooth out flow variations resulting therefrom. Pressure pulsations are absorbed in the pulsation damper by compression of a fluid volume within the damper. Most dampers employ a diaphragm to separate the compressible damping fluid from the working fluid in the pumped system. This permits damping to be performed without contaminating the pump fluid.

The size and type of pump in the system determines the performance requirements for the pulsation damper in the system. The performance of the pulsation damper is related to the volume of compressible fluid in the chamber behind the diaphragm and the amount of fluid volume required to compensate for fluid output loss.

In a so-called "precharge" type pulsation damper, a precharge of compressible fluid, hereinafter air, is provided to the air chamber behind the diaphragm. The air chamber precharge is typically on the order of 80 percent of the working system pressure. This precharge is commonly manually provided and manually adjusted when system pressures are changed.

Another type of pulsation damper provides automatic pressure compensation so that the air pressure behind the diaphragm is maintained in its optimal range automatically in response to changes in the operating pressure range of the system.

In operation, pulsation dampers absorb the energy of pressure pulses by compression of the air volume behind the diaphragm. That energy is returned to the system by expansion of the air in response to pressure drops in the system. These compressions and expansions are accompanied by equivalent increases and decreases in the volume of the working fluid portion of the pulsation damper. Typically, self-compensating or automatic pulsation dampers adjust air volume and pressure by admitting or releasing air in response to pressure changes in the working system. These adjustments occur whenever the displacement of the diaphragm exceeds some limit as determined by the pumping conditions. Usually, a rod which is connected to the diaphragm, reciprocates in response to movements of the diaphragm and operates a compressed air inlet or exhaust valve. Since these rods penetrate the wall of the air chamber, they require lip seals to prevent unintended leakage of air from the chamber. These seals as well as the mating portion of the reciprocating rod are subject to wear and may require frequent maintenance. Ultimately, such maintenance requirements reduce the productivity of the system in which the pulsation damper is used.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a pulsation damper for a pumped liquid system comprising a housing having first and second axially identical ends defined by first and second axially identical hollow halves, each having a threaded port on a longitudinal axis and a threaded stacking port radially outward therefrom, said halves being joined to form a substantially cylindrical cavity; flexible non-porous means for dividing said cavity into first and second chambers at said first and second housing end, respectively; means for connecting said first housing end to the pumped liquid system to admit liquid to said first chamber; and means for pressurizing said second chamber with a gas.

The foregoing and other aspects will become apparent from the following detailed description of the invention when considered in conjunction with the accompanying drawing figures.

BRIEF DESCRIPTION OF THE DRAWINGS

FIG. 5 is a schematic cross sectional illustration of the self-compensating pulsation damper of FIG. 4 illustrating side by side stacking.

DETAILED DESCRIPTION

Figure 1:
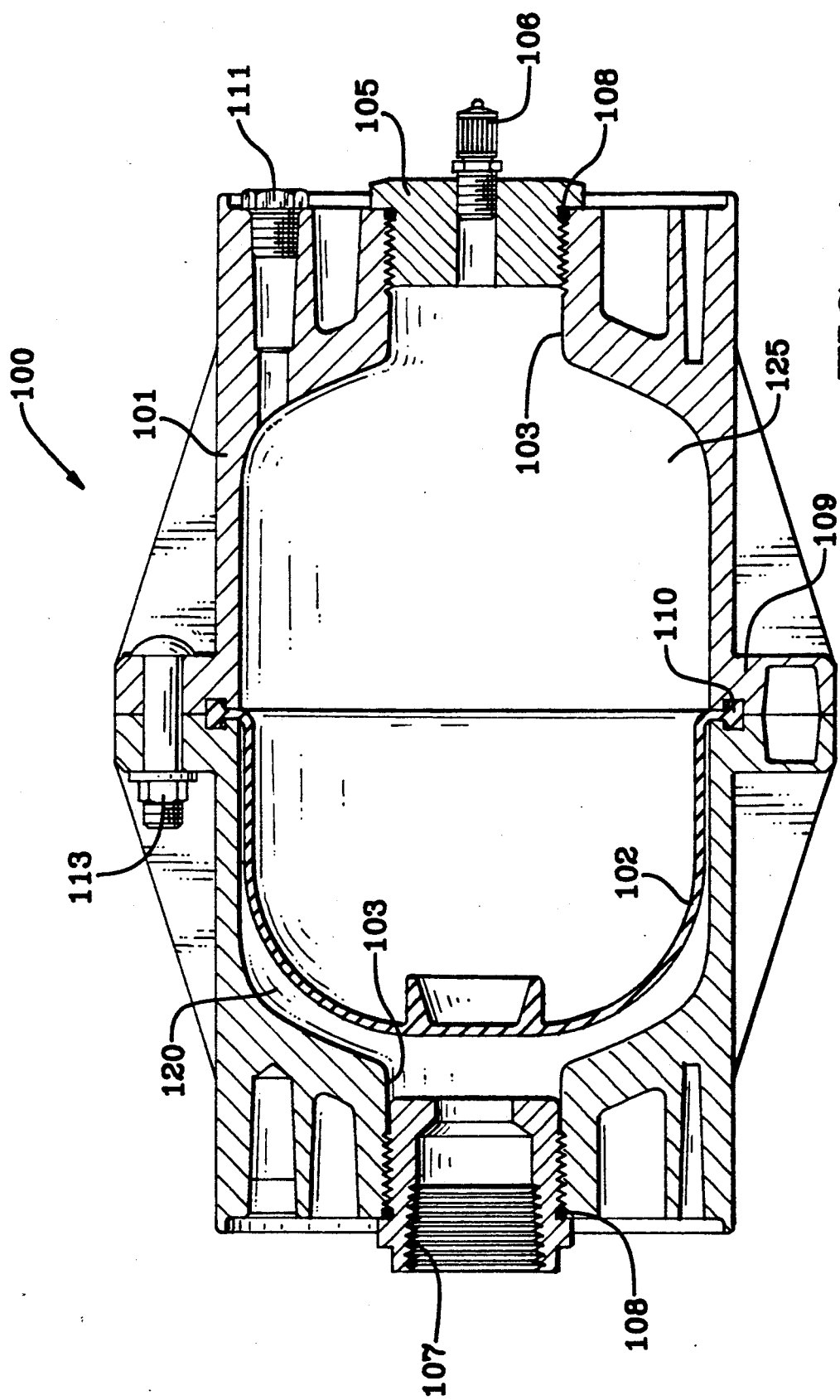
FIG. 1 is a schematic cross sectional view of a precharge type pulsation damper of the present invention.

FIG. 1 shows a precharge type pulsation damper according to the present invention. It consists of a housing 100 made up of two identical housing halves 101. Each half 101 has a port 103 and a flange 109. The two halves are joined by flange fasteners 113 which may be either bolts or ring clamps. A flexible non-porous diaphragm or bellows is circumferentially secured by clamping groove 110 between housing flanges 109. There is a stacking port 151, which in this case is sealed by plug 111. Pressurizing valve 106, which is a similar manually pressurized valve to those found in pneumatic tires, is shown threaded into pressurizing valve adapter 105 which is threaded into port 103 and sealed with seal 108. Seal 108 is required because the adapter 105 and port 103 have straight threads. Pipe adapter 104 is threaded into the opposite housing end at the liquid inlet. Pipe adapter 104 has the same straight threads and requires the same seal 108 as does pressurizing valve 105. Pipe thread 107 on the inside diameter of pipe adapter 104 is axially placed in the pipe adapter, outside the straight threads of the adapter which engage the straight threads of port 103 as shown in the figures, such that any radial forces generated by tightening to the tapered pipe thread 107 will be absorbed in pipe adapter 104 and will not be transmitted to the housing 101.

As shown in this Figure, housing 100, made up of two identical housing halves 101 which are fastened together by flange fasteners 113 at flanges 109 and thereby clamp a flexible non-porous diaphragm or bellows 102. A liquid inlet is provided through pipe adapter 104 which has internal pipe thread 107 and an external straight thread and seal 108 threaded into port 103. A pressurizing valve 106 located opposite the liquid inlet is threaded into a pressurizing valve adapter having an identical external thread to that of the liquid inlet and also having the seal 108. The diaphragm 102 defines a liquid chamber 120 and a gas chamber 125. The gas chamber volume is many times as large as the liquid chamber volume as shown. The actual difference required between the two volumes is determined by the pump capacity and by the pressure and flow requirements of the system. Thus, for a large capacity pump having large volume pulsations the ratio of gas chamber 125 to liquid chamber 120 volumes will be large. The converse is also true.

Figure 2:
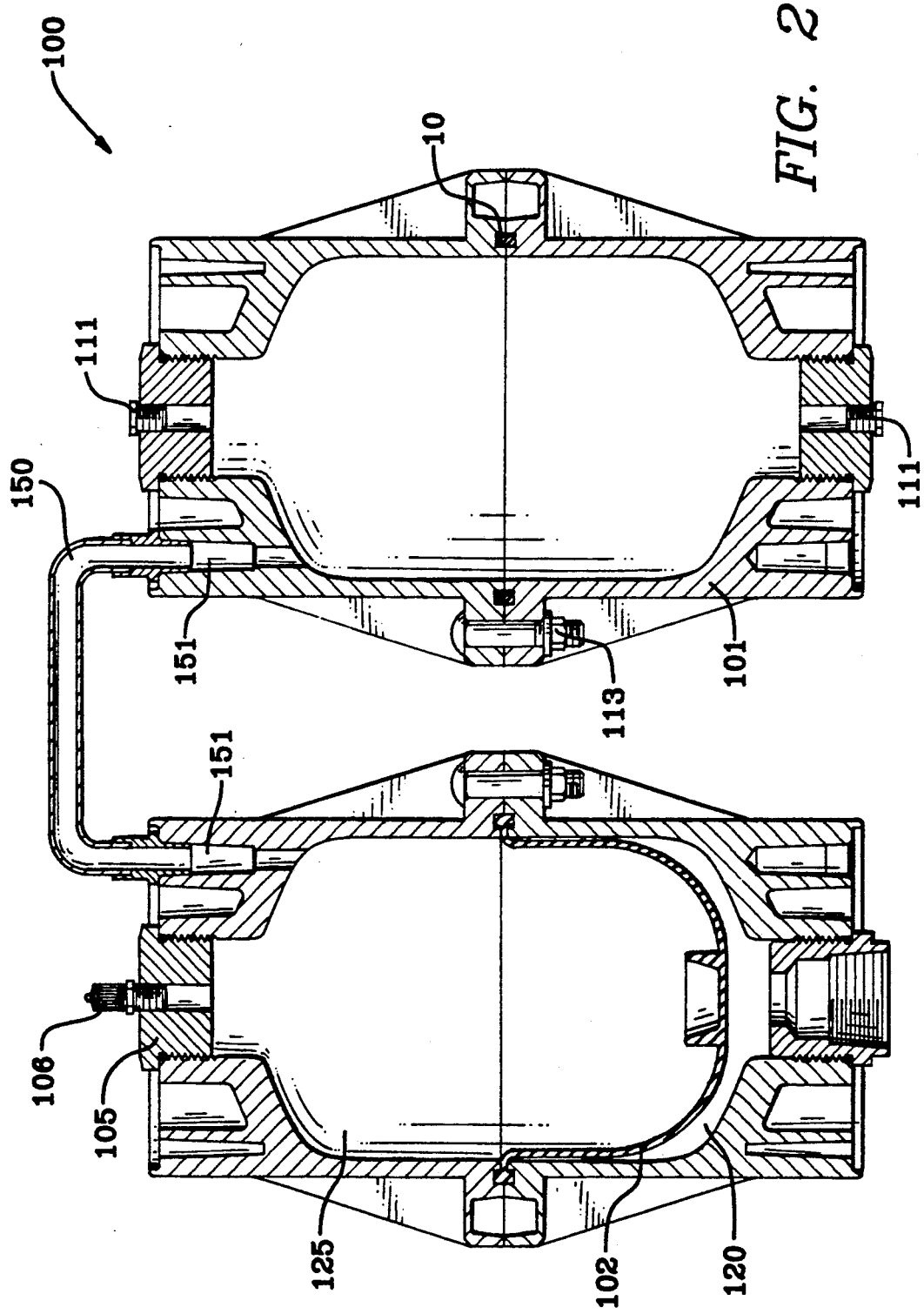
FIG. 2 is a schematic cross sectional illustration of side by side stacking to increase damping gas volume.
Figure 3:
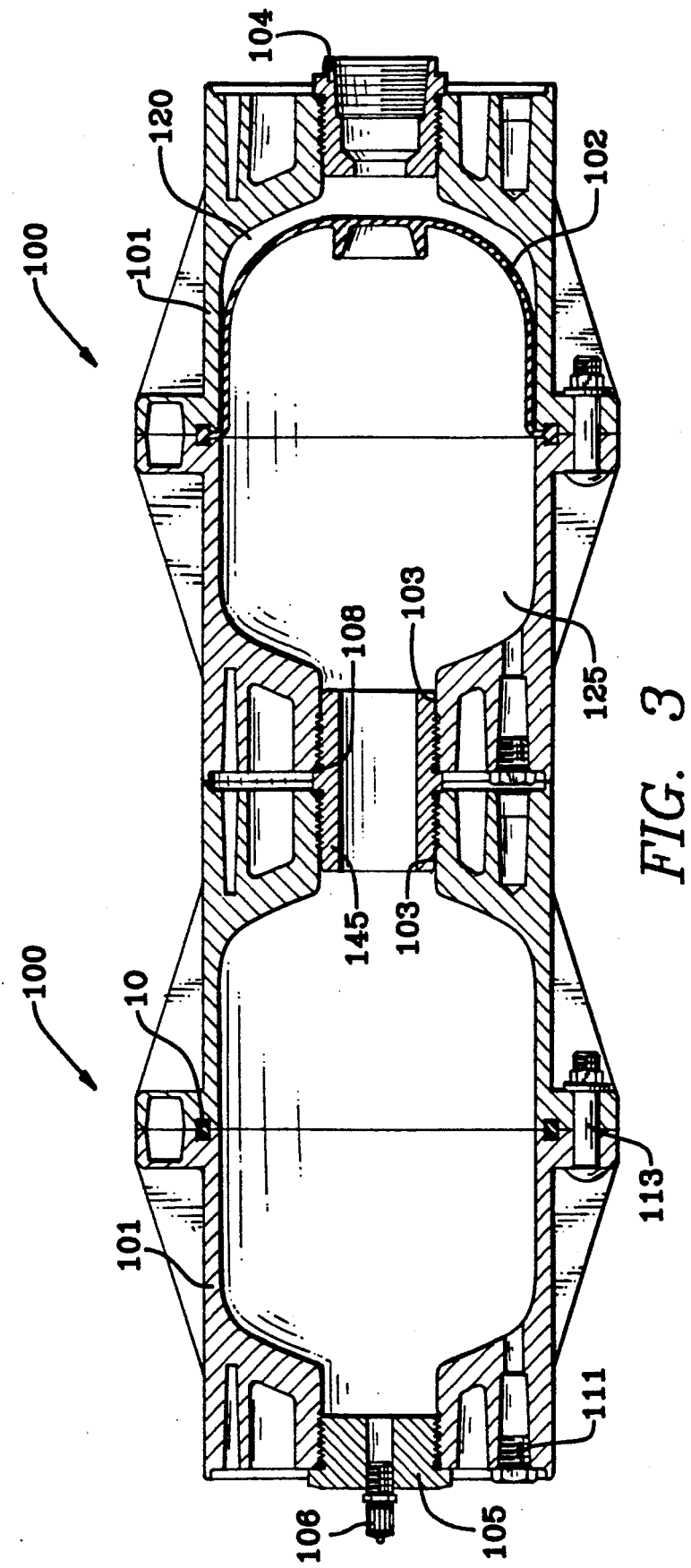
FIG. 3 illustrates end to end stacking.

Considering now FIGS. 1, 2 and 3, stacking of modules to increase effective gas chamber volume may be accomplished in two different manners. The side by side stacking shown in FIG. 2 utilizes two stacking ports 151 and a connector tube 150 to add the required air volume and, thereby, effectively increase the volume of the gas chamber 125. Vertical stacking, as shown in FIG. 3, permits the addition of an air module using stacking adapter fitting 145 and two seal rings 108 to make the connection between ports 103 of the stacked housings 100. No diaphragm is needed in the added module of FIG. 2 and FIG. 3, therefore, a flange seal 10 is provided.

Figure 4:
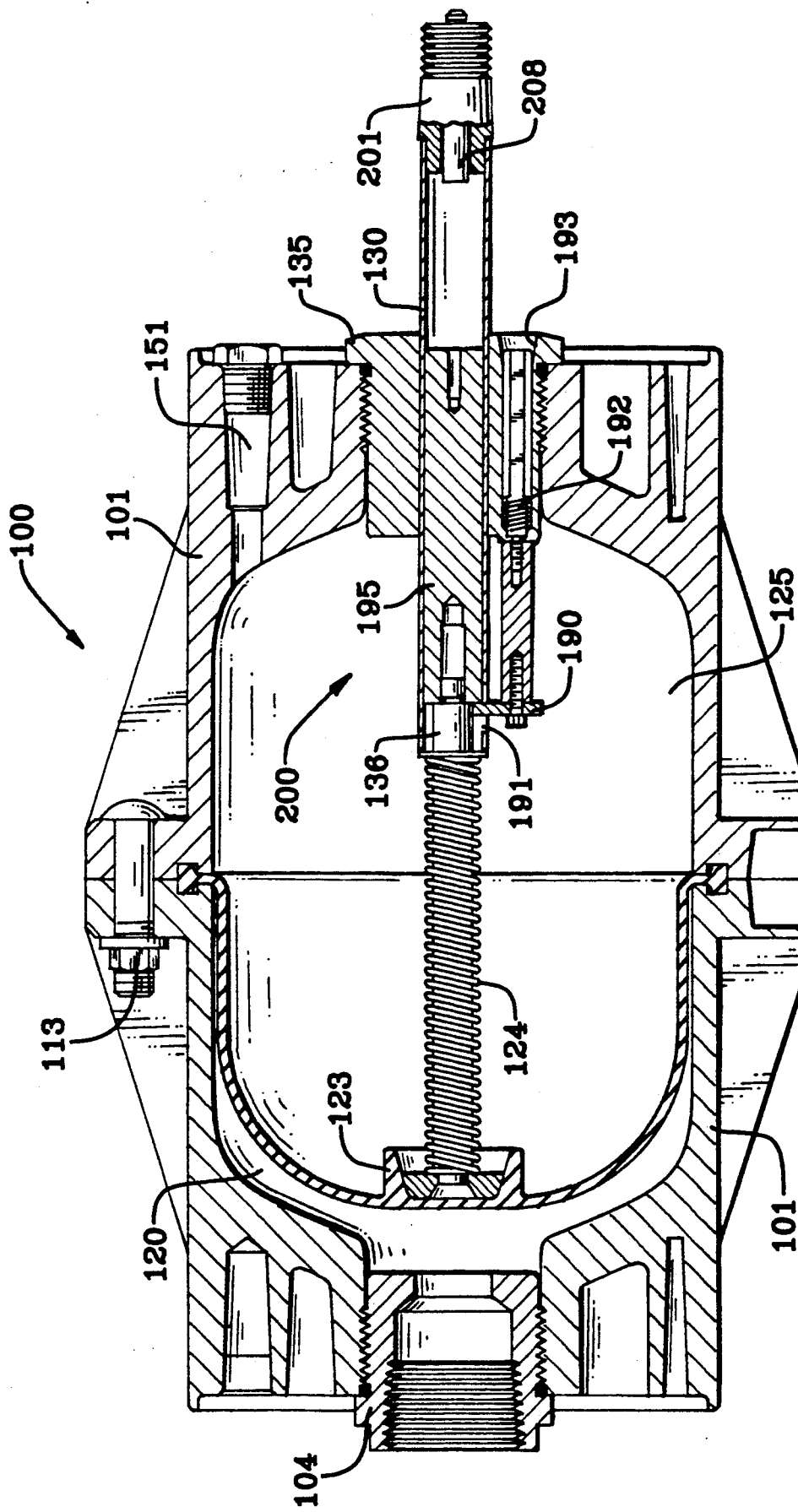
FIG. 4 is a schematic cross sectional view of a pulsation damper incorporating the self-compensating feature of the present invention.

FIG. 4 shows the pulsation damper of the present invention with a novel self-compensating mechanism. Housing 100 is identical in this figure to the housings described in the other figures. Here, compensator assembly 200 is built into compensator adapter 135 and is thus capable of insertion and removal from the housing 100 by merely unscrewing compensator adapter 135. The assembly is made up of compensator follower rod 136 which nests in follower recess 123 of flexible diaphragm 102. Follower spring 124 maintains follower rod 136 in contact with diaphragm 102 so that it follows all motion of the diaphragm. Piston 195 in cylinder 130 is operated by the motion of follower rod 136 and, when it moves far enough upward, it contacts plunger 208 which opens air inlet valve 201 and thereby increases air pressure in gas chamber 125. Note that valve 201 is a poppet type valve which does not have the wear susceptible reciprocating lip seal of earlier compensator devices. When piston 195 moves downward in cylinder 130 it contacts exhaust valve actuator arm 190 which extend from its attachment at the end of the exhaust valve extension arm through slot 191 into cylinder 130. This opens exhaust valve 192, another poppet valve to exhaust some air through exhaust port 193 and thereby reduce the air pressure in gas chamber 125. Addition of modular air volumes to the self-compensating pulsation damper of FIG. 4 can be accomplished by the two modes illustrated in FIGS. 2 and 3. For side by side stacking, the added air module is connected through stacking ports 151 using connector tube 150. For vertical stacking, an extended compensator follower rod 136 is employed in order to provide the additional length needed to reach the diaphragm through the additional module.

Operation of the precharge type damper requires introduction through pressurizing valve 106, in FIG. 1, of a sufficient quantity of compressed air to pressurize gas chamber 125 to approximately 80% of the pumped liquid system pressure. As the liquid is pumped, the pulsations of the system cause liquid to enter liquid chamber 120 through pipe adapter 104. This displaces diaphragm 102 upward and compresses the air volume in gas chamber 125. This increased pressure forces diaphragm 102 downward during the low pressure portion of the pulsation and feeds liquid back into the pumped liquid system. Changes in gas chamber pressure are accomplished by manually adding or releasing compressed air from gas chamber 125 in order to adapt to different pumping requirements.

Operation of the self-compensating pulsation damper is similar to that of the precharge type damper with the exception that relatively large changes in pumping requirements can be automatically compensated, as shown in FIG. 4, through the action of follower rod 136 on piston 195 in cylinder 130. The reciprocal motion of piston 195 pushes against plunger 208 to open air inlet valve 201 or against exhaust valve actuating arm 190 which opens exhaust valve 192 to discharge air from exhaust port 193. It is often desired to attach a tube to exhaust port 193 in order to carry away escaping fluid in the event of a rupture of the flexible diaphragm.

The invention just described provides the advantages of axially identical housing halves having ports which can accommodate the full array of adapters required for the liquid inlet, the manual pressurizing valve, and the compensator assembly. In addition, the design of the compensator assembly allows its insertion or removal from the housing without the necessity of disassembling the housing at the flange. A further advantage provided is the ability to add modular air volumes to the damper as required. This avoids the inconvenience and expense of complete removal of a pulsation damper of one size and replacement with a larger or smaller pulsation damper when changes in pumping requirements are encountered.

For the sake of convenience, figures are presented with the pulsation damper having either vertical of horizontal orientation. This does not indicate a limitation on the ability of the pulsation damper to function in any position.

What is claimed is:

1. A pulsation damper for a pumped liquid system comprising:
    a housing having first and second axially identical ends defined by first and second axially identical hollow halves, each having a threaded port on a longitudinal axis and a threaded stacking port radially outward therefrom, said halves being joined to form a substantially cylindrical cavity;
    flexible non-porous means for dividing said cavity into first and second chambers at said first and second housing ends respectively;
    means for connecting said first housing end to the pumped liquid system to admit liquid to said first chamber; and
    means for pressurizing said second chamber with a gas.

2. The pulsation damper of claim 1, wherein said flexible non-porous means for dividing said cavity into said first and second chambers comprises a diaphragm, having a shape which makes the volume of the first chamber a small fraction of that of the second chamber when said diaphragm is relaxed.

3. The pulsation damper of claim 1, wherein said flexible non-porous means for dividing said cavity into first and second chambers comprises a bellows having a shape which makes the volume of the first chamber a small fraction of the second chamber volume when said bellows is relaxed.

4. The pulsation damper of claim 1, wherein the means for connecting said first housing end to the pumped liquid system comprises a pipe adapter fitting having a straight external thread and an internal pipe thread, said pipe thread being axially displaced in said adapter so as to cause radial stresses due to tightening of the pipe in the adapter to be absorbed by the pipe adapter.

5. The pulsation damper of claim 1, wherein said means for pressurizing said second chamber with a gas comprises a manual pressurizing valve and a pressurizing valve adapter, said adapter having external threads for threading into the threaded, axially located port of the second housing half.

6. The pulsation damper of claim 1, further comprising:
means for increasing the effective volume of the second chamber, including one or more added housings connected to said pulsation damper through a connector tube attached to the threaded stacking ports on said pulsation damper and on each of said one or more added housings.

7. The pulsation damper of claim 1, further comprising: means for increasing the effective volume of said second chamber including connection of one or more axially aligned housings to said pulsation damper each connected through a radially centered stacking adapter fitting which permits joining housings through the threaded ports located on the longitudinal axes thereof.

8. The pulsation damper of claim 1, further comprising:
self-compensating means for adjusting the gas pressure within the second chamber in response to large variations in system pumping demands, said self-compensating means having a size and shape such that it can be inserted and removed from the pulsation damper housing through the threaded axially located port on the longitudinal axis of the second housing half and secured there by an integral threaded compensator adapter.

9. The pulsation damper of claim 8, wherein the self-compensating means for adjusting gas chamber pressure comprises poppet type inlet and exhaust valves, said inlet valve being connectable to a supply of compressed gas.

* * * * *